United States Patent [19]
Kassouf et al.

[11] Patent Number: 5,111,712
[45] Date of Patent: May 12, 1992

[54] ROLLING ELEMENT RADIAL COMPLIANCY MECHANISM

[75] Inventors: Thomas L. Kassouf, Syracuse; Howard H. Fraser, Jr., Lafayette; Shahrokh Etemad, East Syracuse; William R. Lane, Dewitt, all of N.Y.

[73] Assignee: Carrier Corporation, Syracuse, N.Y.

[21] Appl. No.: 254,058

[22] Filed: Oct. 6, 1988

[51] Int. Cl.⁵ .................... G05G 1/00; F04C 11/02
[52] U.S. Cl. .................. 74/570; 418/DIG. 1
[58] Field of Search .......... 418/55 D, 55 R, 55 C, 418/55 E, DIG. 1, 86, 104; 74/570

[56] References Cited

U.S. PATENT DOCUMENTS

| | | | |
|---|---|---|---|
| 4,403,927 | 9/1983 | Butterworth et al. | 418/55 E |
| 4,435,136 | 3/1984 | Terauchi et al. | 418/104 X |
| 4,484,869 | 11/1984 | Nakayama et al. | 418/86 X |
| 4,538,975 | 9/1985 | Tsukagoshi | 418/DIG. 1 X |

FOREIGN PATENT DOCUMENTS

| | | | |
|---|---|---|---|
| 0106190 | 6/1983 | Japan | 418/55 D |
| 0215480 | 9/1986 | Japan | 418/55 D |
| 0150005 | 7/1987 | Japan | 418/55 R |
| 0288381 | 12/1987 | Japan | 418/55 R |
| 0001788 | 1/1988 | Japan | 418/55 R |

Primary Examiner—Vinh T. Luong

[57] ABSTRACT

The crankshaft and orbiting scroll of a scroll compressor are drivingly connected through a bearing. The bearing is made up of a plurality of roller elements of varying diameters in line contact with both the crankshaft and the orbiting scroll and serving to locate the crankshaft and orbiting scroll eccentrically with respect to each other and thereby provide radial compliancy.

8 Claims, 2 Drawing Sheets

ROLLING ELEMENT RADIAL COMPLIANCY MECHANISM

BACKGROUND OF THE INVENTION

1. Field of Invention

A scroll compressor has two scrolls made up of spiral wraps which are integral with, or mounted to, corresponding plates. In assembly, the spiral wraps are interfitted such that one wrap is rotationally displaced 180° with respect to the other. The wraps and the plates coact to define a plurality of symmetrical lunettes. At the tips of the lunettes a seal is established between the flanks of the two wraps. The flanks may be in actual line contact or may have a small clearance which is typically sealed by oil. At the top and bottom of each lunette there is an axial seal between the tip of the wrap of one scroll and the opposing plate of the other scroll and they may be in actual contact, may employ tip seals and may even allow for a differential thermal expansion across the scrolls. One scroll is fixed and the other scroll is driven in an orbiting motion relative to the fixed scroll. The compression process begins at the periphery of the wraps and proceeds inwardly to a centrally located common discharge port. The tips of the lunettes move along the walls of the wraps during the compression process while the tips of the wraps of the fixed and orbiting scrolls relatively move across the face of the opposing plate in an orbiting motion. In a conventional wrap configuration, as many as three symmetrical pairs of lunettes can exist at any time. Because the lunettes decrease in volume as they move from suction to discharge, there is a pressure differential across the flank seals and tip seals which creates a tendency for leakage.

2. Description of the Prior Art

A radial compliance mechanism has been used to provide the flank seals by allowing controlled radial movement of the orbiting scroll with respect to the fixed scroll by varying the eccentricity. One type of device used for this purpose is an eccentric bushing. This type of device is activated by gas and/or centrifugal forces and provides a radial sealing force between the wraps thereby reducing radial clearances and leakage as well as minimizing the effects of manufacturing tolerances.

SUMMARY OF THE INVENTION

A radial compliance mechanism is provided which eliminates the eccentric bushing and replaces it with a bearing. The bearing is formed as a series of cylindrical rollers arranged in a ring and varying in size between the largest and smallest which are 180° apart, or, if there are an even number of rollers, symmetrical about a diameter. They are mounted or located loosely enough to permit rolling contact. As in the case of a conventional radial compliance mechanism, the bearing is located between the crankshaft and the boss or hub of the orbiting scroll, which is within the bearing. However, because the bearing is made up of rollers, there is circumferentially spaced line contacts rather than cylindrical surface contact. There is a reduced friction because of the resultant rolling contact between the scroll hub and the cylindrical elements and there is a reduced lubrication demand. The spacing or interstices between the rollers and the cage or other confining structure provides an extensive area of the rollers that can be lubricated. This combination of features permits the use of mist lubrication.

It is an object of this invention to provide a radial compliance mechanism having reduced friction. It is another object of this invention to permit radial compliance to occur at lower gas force levels. It is a further object of this invention to reduce bearing wear and seizures. It is an additional object of this invention to eliminate the eccentric bushing in a radial compliance mechanism. These objects, and others as will become apparent hereinafter, are accomplished by the present invention.

Basically, the crankshaft of a scroll compressor is eccentrically spaced from the bore of the boss of the orbiting scroll by a bearing made up of a plurality of cylindrical rollers of varying sizes. The rollers may or may not be in a cage. However, the location of the rollers relative to the boss of the orbiting scroll must be controlled.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
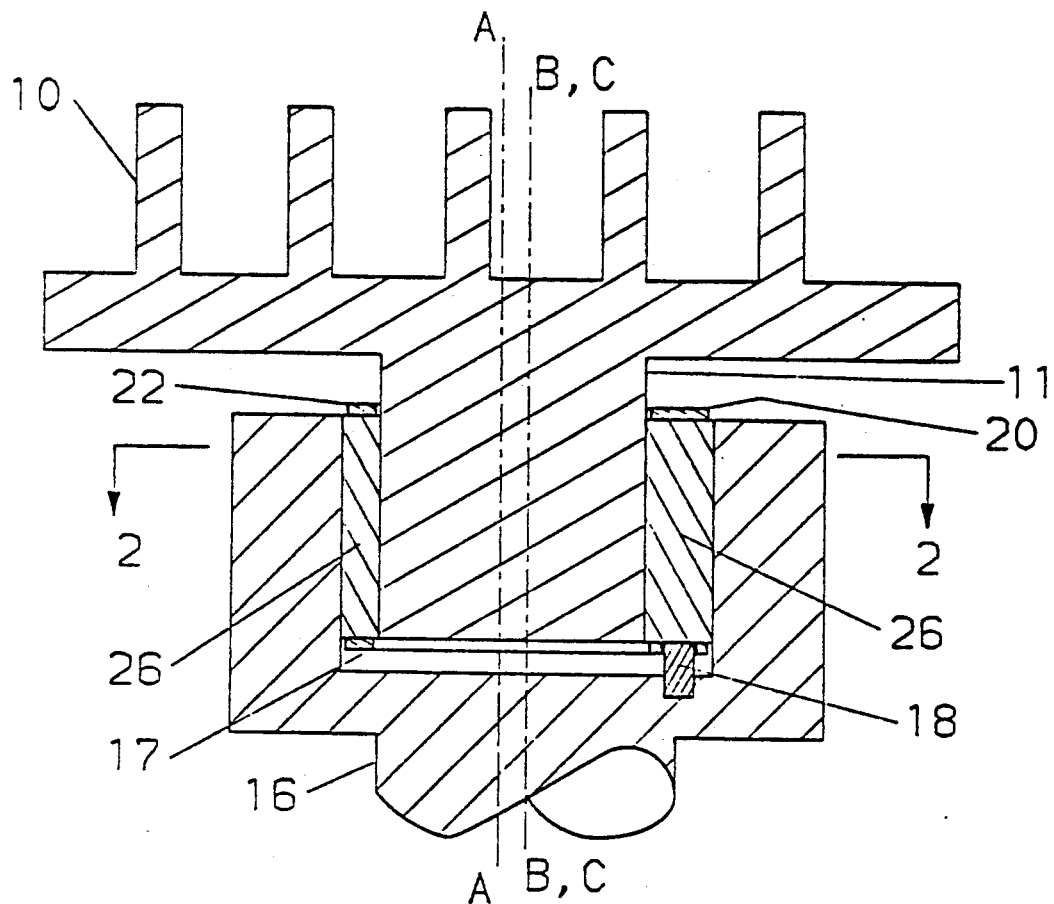
FIG. 1 is a sectional view of a portion of a scroll compressor employing a preferred embodiment of the bearing.
Figure 2:
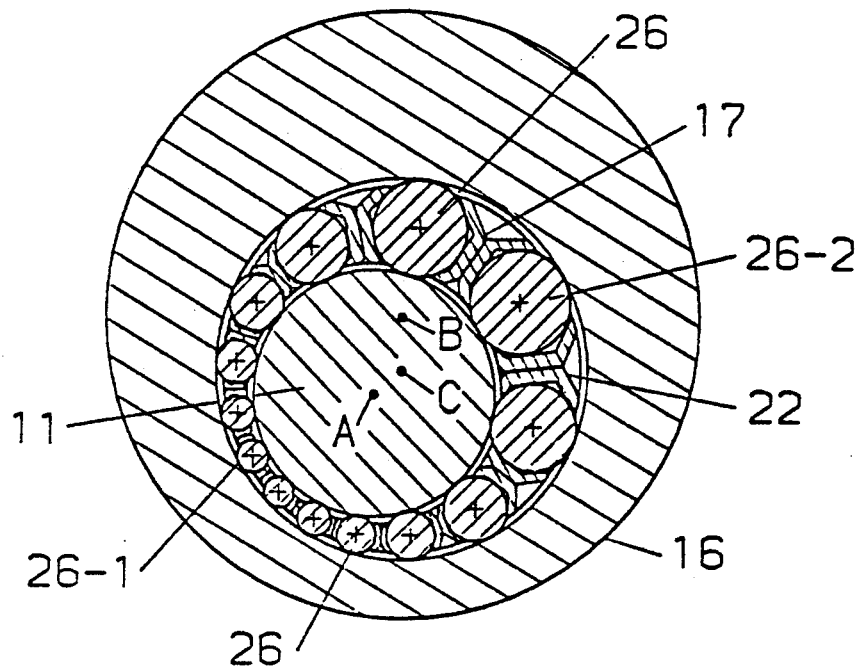
FIG. 2 is a sectional view taken along line 2—2 of FIG. 1.
Figure 3:
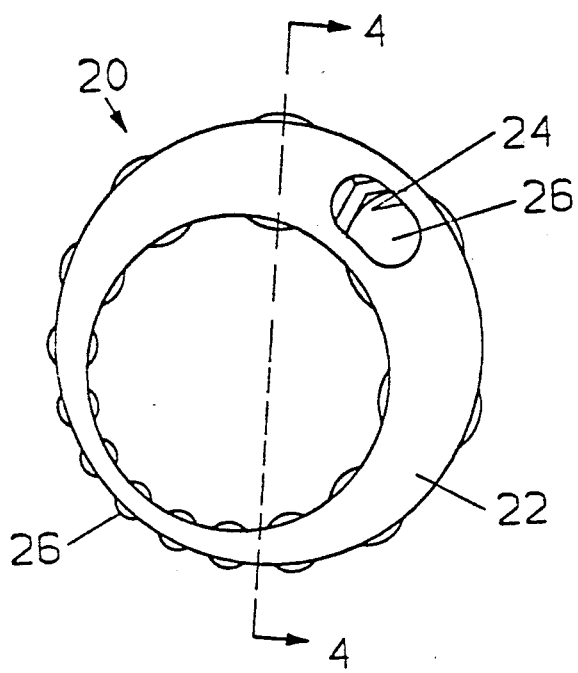
FIG. 3 is a bottom view of the bearing of FIG. 1.
Figure 4:
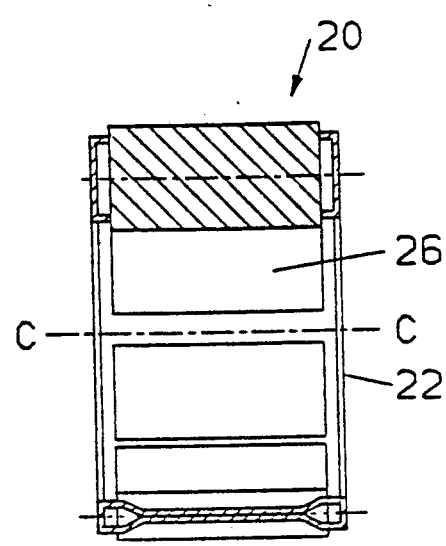
FIG. 4 is a sectional view taken along line 4—4 of FIG. 3.

In FIG. 1, the numeral 10 generally designates the orbiting scroll of a scroll compressor. The orbiting scroll 10 gas an axially extending boss 11 which has an axis A—A and which provides a driving connection for the orbiting scroll 10. Crankshaft 16 is connected to a motor (not illustrated) and has a circular recess 17 formed in one end with the recess 17 being eccentrically located with respect to the axis of rotation, B—B, of crankshaft 16. Boss 11 is located within and spaced from the walls defining recess 17 by bearing 20. A pin 18 coacts with slot 24 which is formed in cage 22 of bearing 20, as is best shown in FIG. 3. Referring now to FIGS. 2-4, it will be noted that that axes A—A and B—B appear as points A and B respectively, and that C—C, point C, is the axis of bearing 20. Bearing 20 is made up of a plurality of cylindrical roller elements 26 of varying diameters. The roller element(s) 26-1 with the smallest diameter is diametrically opposite the roller element(s) 26-2 with the largest diameter so that there is symmetry about a diameter. Each of the roller elements 26 is rotatably supported in cage 22 and has a line contact with both boss 11 and the wall of recess 17 so that boss 11 is eccentrically located with respect to recess 17 because of the varying diameters of roller elements 26.

In operation, rotation of crankshaft 16 causes rotation of roller elements 26 through their line contact with the eccentrically located wall of recess 17. Roller elements 26 are rotatably supported by cage 22 and through their line contact drive boss 11 and thereby orbiting scroll 10 while minimizing friction. Orbiting scroll 10 coacts with the fixed scroll (not illustrated) in a plurality of line contacts to define the lunettes. Because crankshaft 16, and therefore the walls of recess 17, is rotating the while boss 11 is held to an orbiting motion due to an Oldham coupling (not illustrated), there is a differential movement which is partially accommodated by a slippage or sliding of roller elements 26. Circumferential movement of bearing 20 and its rollers 26 relative to crankshaft 16 is limited by the coaction of pin 18 and slot 24. This relative movement accommodates the tendency for movement of bearing 20 due to the differential linear movement rates of the rollers 26 due to their different radial position relative to the rotational axis B—B of crankshaft 16 due to the eccentricity of recess 17. This eccentricity is, in part, effectively reduced by the different axes of rotation of the rollers 26 relative to the wall of recess 17 due to their varying diameter. Also this relative movement accommodates the effects of wear on the scroll wraps, bearing recess and boss and thereby permits the wraps of the fixed and orbiting scrolls to maintain their line contacts.

Figure 5:
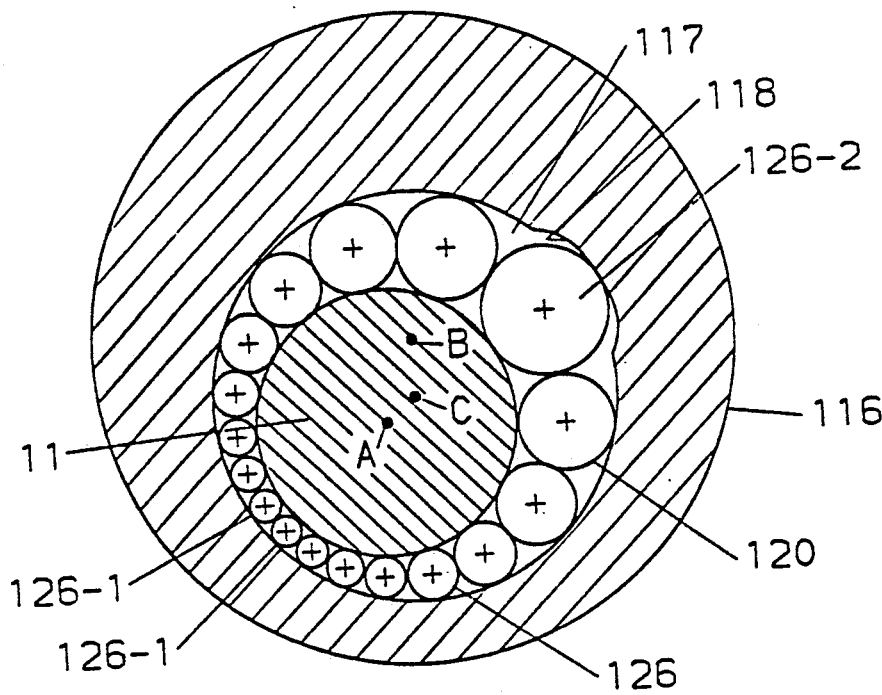
FIG. 5 is a sectional view of a second embodiment of the bearing which corresponds to FIG. 2.

Referring now to FIG. 5, a second embodiment of the bearing is disclosed. Bearing 120 is cageless so that roller elements 126 have line contact with the wall of recess 117 in crankshaft 116 and with boss 11 of orbiting scroll 10. Roller elements 126 do not rotate about fixed axes as is the case where a cage is used and, as a result, are in line contact with adjacent roller elements 126 and tend to move around boss 11. To keep the roller elements 126 from moving around boss 11, slot 118 is formed in the wall defining recess 117. The largest diameter roller element, 126-2, is received in and has line contact with slot 118 and is capable of a degree of circumferential movement with respect to slot 118 but is not able to move beyond slot 118. Thus, the coaction of slot 118 with roller element 126-2 in the equivalent of the coaction of pin 18 and slot 24 in the FIG. 1 embodiment.

The operation of bearing 120 is similar to that of bearing 20 in that each of the roller elements 126 has line contact with both the boss 11 and the wall of recess 17. Also, limited circumferential movement of the roller elements 126 is possible because of the coaction of roller element 126-2 with slot 118 to allow the elements to compensate for wear and manufacturing tolerances. The operation of bearing 120 differs from that of bearing 20 in that the roller elements have line contact with each other and do not have a fixed axis of rotation. As a result, roller elements are positioned by centrifugal/gas forces and there will be a point of separation between two adjacent roller elements such as between the two smallest diameter roller elements 126-1.

Although preferred embodiments of the present invention have been illustrated and described, other changes will occur to those skilled in the art. For example, although the hub of the orbiting scroll is illustrated and described as being received in the bearing, the crankshaft could be received in the bearing. It is, therefore, intended that the present invention is to be limited only by the scope of the appended claims.

What is claimed is:

1. A rolling element radial compliancy mechanism comprising:
   a first element having a generally cylindrical recess formed therein;
   a second element having a generally cylindrical portion adapted to be received within said cylindrical recess with a clearance therebetween;
   bearing means located in said clearance and including a plurality of roller elements adapted to be in line contact with both said first and second elements and a cage for supporting said plurality of roller elements, said plurality of roller elements being of varying diameters such that said second element is positioned eccentrically within said cylindrical recess.

2. A rolling element radial compliancy mechanism comprising:
   a first element having a generally cylindrical recess formed therein;
   a second element having a generally cylindrical portion adapted to be received within said cylindrical recess with a clearance therebetween;
   bearing means located in said clearance and including a plurality of roller elements adapted to be in line contact with both said first and second elements, said plurality of roller elements being of varying diameters such that said second element is positioned eccentrically within said cylindrical recess; and
   means to limit relative rotation between said bearing means and said first element.

3. The radial compliancy mechanism of claim 2 wherein said means to limit relative rotation includes a slot in said generally cylindrical recess and one of said roller elements received in said slot and coacting therewith so as to limit the circumferential movement of all of said roller elements.

4. The radial compliancy mechanism of claim 3 wherein each of said plurality of roller elements are adapted to be in line contact with adjacent ones of said plurality of roller elements.

5. In a scroll compressor having an orbiting scroll driven by a crankshaft, a rolling element radial compliancy mechanism comprising:
   a generally cylindrical recess formed in one of said orbiting scroll and said crankshaft;
   a generally cylindrical portion formed on the other one of said orbiting scroll and said crankshaft and adapted to be received within said cylindrical recess with a clearance therebetween;
   bearing means located in said clearance and including a plurality of roller elements adapted to be in line contact with both said orbiting scroll and said crankshaft and a cage for supporting said plurality of roller elements, with said roller elements being of varying diameters such that said cylindrical portion is positioned eccentrically with respect to said cylindrical recess.

6. In a scroll compressor having an orbiting scroll driven by a crankshaft a rolling element radial compliancy mechanism comprising:
   a generally cylindrical recess formed in one of said orbiting scroll and said crankshaft;
   a generally cylindrical portion formed on the other one of said orbiting scroll and said crankshaft and adapted to be received within said cylindrical recess with a clearance therebetween;
   bearing means located in said clearance and including a plurality of roller elements adapted to be in line contact with both said orbiting scroll and said crankshaft with said roller elements being of varying diameters such that said cylindrical portion is positioned eccentrically with respect to said cylindrical recess; and means to limit relative rotation between said bearing means and said generally cylindrical recess.

7. The radial compliancy mechanism of claim 6 wherein said means to limit relative rotation includes a slot in said generally cylindrical recess and one of said roller elements received in said slot and coacting therewith so as to limit the circumferential movement of all of said roller elements.

8. The radial compliancy mechanism of claim 7 wherein each of said plurality of roller elements are adapted to be in line contact with adjacent ones of said plurality of roller elements.

* * * * *